US012092282B2

(12) United States Patent
Jun

(10) Patent No.: US 12,092,282 B2
(45) Date of Patent: Sep. 17, 2024

(54) LAMP FOR VEHICLE, AND LAMP ASSEMBLY FOR VEHICLE INCLUDING THE SAME

(71) Applicant: HYUNDAI MOBIS CO., LTD., Seoul (KR)

(72) Inventor: Young Geun Jun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/543,544

(22) Filed: Dec. 18, 2023

(65) Prior Publication Data

US 2024/0230046 A1 Jul. 11, 2024

(30) Foreign Application Priority Data

Jan. 6, 2023 (KR) ........................ 10-2023-0002397

(51) Int. Cl.

*F21S 41/275* (2018.01)
*F21S 41/265* (2018.01)
*F21S 41/40* (2018.01)

(52) U.S. Cl.

CPC ........... *F21S 41/275* (2018.01); *F21S 41/265* (2018.01); *F21S 41/40* (2018.01)

(58) Field of Classification Search

CPC ........ F21S 41/275; F21S 41/26; F21S 41/143; F21S 43/26; F21S 43/40; F21V 5/005; F21V 5/045

See application file for complete search history.

(56) References Cited

U.S. PATENT DOCUMENTS

2019/0264886 A1* 8/2019 Sousek .................. F21S 43/31
2022/0107068 A1* 4/2022 Lim .................. G02B 19/0014

* cited by examiner

*Primary Examiner* — Sean P Gramling
(74) *Attorney, Agent, or Firm* — Novo TechIP International PLLC

(57) ABSTRACT

Disclosed is a lamp for a vehicle including a light emitting part that irradiates light along a first direction, a pattern forming part disposed in the first direction of the light emitting part, and that forms a specific pattern by shielding a portion of the light, and a refraction part disposed in the first direction of the pattern forming part, and that refracts the light that passed through the pattern forming part, the refraction part includes a plurality of facets formed to be stepped along a second direction that crosses the first direction.

10 Claims, 9 Drawing Sheets

LAMP FOR VEHICLE, AND LAMP ASSEMBLY FOR VEHICLE INCLUDING THE SAME

CROSS-REFERENCE TO RELATED APPLICATIONS

This application claims the benefit of priority to Korean Patent Application No. 10-2023-0002397, filed in the Korean Intellectual Property Office on Jan. 6, 2023, the entire contents of which are incorporated herein by reference.

TECHNICAL FIELD

The present disclosure relates to a lamp for a vehicle, and a lamp assembly for a vehicle including the same.

BACKGROUND

A matrix headlamp technology is a technology for causing a lamp to interwork a camera sensor to increase visibility by partially turning on a high beam even when an opposite vehicle or a precedent vehicle is present. To achieve this, the matrix headlamp includes a plurality of LEDs, and controls turning-on/off thereof individually.

A focusing lens having a curved surface that is continuous is mainly applied as an outer lens of the matrix headlamp module. An example of them is an aspheric lens, of which vertical and horizontal focuses are the same, or an anamorphic lens, of which vertical and horizontal focuses are different. Also, there are forms, in which several lenses are integrally coupled to each other.

However, to differentiate designs and reinforce an aesthetic aspect, needs to add structures, such as a design bezel, or to differentiate a lighting image are increasing. To differentiate lighting images, there are many optical restrictions in differentiating light emission areas for implementing original headlamp functions, and thus a scheme of improving an optical system, in addition to existing light emission areas, has been utilized.

SUMMARY

The present disclosure has been made to solve the above-mentioned problems occurring in the prior art while advantages achieved by the prior art are maintained intact.

An aspect of the present disclosure provides a lamp for a vehicle having improved lighting image and non-lighting image, and a lamp assembly including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light emitting part that irradiates light along a first direction, a pattern forming part disposed in the first direction of the light emitting part, and that forms a specific pattern by allowing a portion of the light to pass through to form the pattern and by shielding a remaining portion of the light, and a refraction part disposed in the first direction of the pattern forming part, and that refracts the light that passed through the pattern forming part, the refraction part includes a plurality of facets formed to be stepped along a second direction that crosses the first direction.

In another example, when one direction that is perpendicular to the first direction and the second direction is a third direction, the facets may include a plurality of first facet parts which form rows extending along the second direction, and a plurality of second facet parts that form rows extending in the second direction, the rows of first facet parts and rows of second facet parts being arranged in an alternating manner in the third direction, and the second facet parts protrude farther in the first direction than the first facet parts to which they are adjacent.

In another example, the refraction part may include an input surface, through which the light enters the refraction part, and an output surface via which the light is output, and the facets may be formed on the input surface or the output surface.

In another example, the input surface may be convex, and the facets may be formed on the output surface.

In another example, the output surface may be convex, and the facets may be formed on the input surface.

In another example, a plurality of light emitting parts may be formed, and the pattern forming part may include a plurality of first parts extending in the first direction, and of which ends in an opposite direction to the first direction are connected to the plurality of light emitting parts, respectively, and a second part connected to sides of the plurality of first parts in the first direction, and having a shape extending in the third direction.

In another example, when viewed along the first direction, areas of ends of the first parts in the opposite direction to the first direction may be smaller than areas of ends of the first parts in the first direction.

In another example, the plurality of facets may have corresponding shapes.

According to another aspect of the present disclosure, a lamp assembly for a vehicle includes a first lamp including a first light emitting part that irradiates a first light along a first direction, a first pattern forming part disposed in the first direction of the first light emitting part, and that forms a specific pattern by allowing a portion of the first light to pass through to form the pattern and by shielding a remaining portion of the first light, and a first refraction part disposed in the first direction of the first pattern forming part, and that refracts the light that passed through the first pattern forming part, and a second lamp including a second light emitting part that irradiates a second light along the first direction, a second pattern forming part disposed in the first direction of the second light emitting part, and that forms a specific pattern by allowing a portion of the second light to pass through to form the pattern and by shielding a remaining portion of the second light, and a second refraction part disposed in the first direction of the second pattern forming part, and that refracts the light that passed through the second pattern forming part, the first refraction part may include a plurality of first facets having a stepped configuration that extends in a second direction that crosses the first direction, the second refraction part includes a plurality of second facets formed to be stepped along the second direction, and the second lamp is disposed in the second direction of the first lamp.

In another example, the second refraction part may contact a side of the first refraction part in the second direction.

In another example, when an irradiation area formed as the first light irradiated from the first light emitting part passes through the first refraction part is a first irradiation area, and when an irradiation area formed as the second light irradiated from the second light emitting part passes through the second refraction part is a second irradiation area, the first irradiation area may partially overlap the second irradiation area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
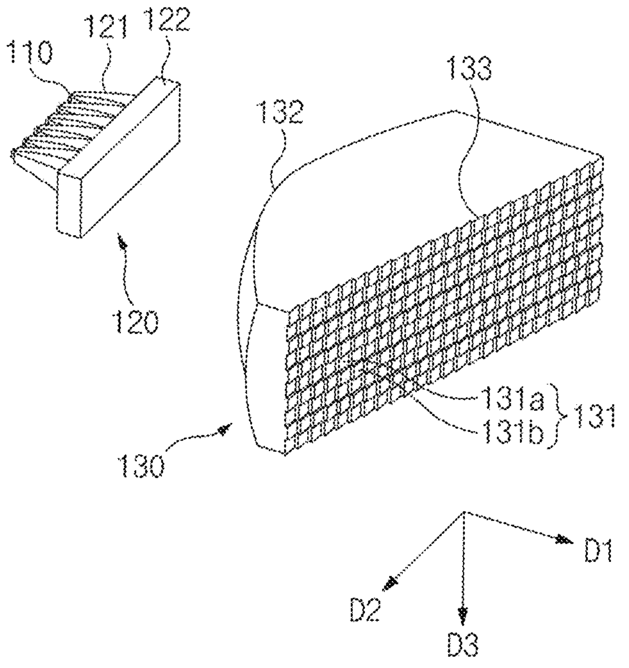
FIG. 1 is a perspective view conceptually illustrating a lamp for a vehicle according to an embodiment of the present disclosure.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

A lamp according to an embodiment of the present disclosure relates to a lamp that may be used for a vehicle. As an example, the lamp for a vehicle may be a headlamp. As an example, the lamp for a vehicle may be a lamp for irradiating a high beam. However, it is apparent that the present disclosure is not limited thereto and the lamp according to an embodiment of the present disclosure may be applied to lamps of various fields, such as a rear lamp.

In the specification, a forward/rearward direction, a leftward/rightward direction, and an upward/downward direction are referred for convenience of description, and may be directions that are perpendicular to each other. However, the directions are determined relatively to a direction, in which the lamp is arranged, and the upward/downward direction does not always mean a vertical direction.

FIG. 1 is a perspective view conceptually illustrating a lamp for a vehicle according to an embodiment of the present disclosure.

The lamp for a vehicle may include a light emitting part 110, a pattern forming part 120, and a refraction part 130. The light emitting part 110 may irradiate light along a first direction D1. The pattern forming part 120 may be disposed on in the first direction D1 of the light emitting part 110 to form a specific pattern by allowing a portion of the light to pass through and shielding a remaining portion of the light. As an example, the specific pattern may be an irradiation area having a rectangular shape.

The refraction part 130 may be disposed in the first direction D1 of the pattern forming part 120 and may be configured to refract the light that passed through the pattern forming part 120. The refraction part 130 may include a plurality of facets 131. The plurality of facets 131 are stepped along a second direction D2 that crosses the first direction D1. The plurality of facets 131 may have corresponding shapes. Furthermore, although it is illustrated as if the plurality of facets 131 were flat surfaces, partial areas thereof may have curved surfaces.

Figure 2:
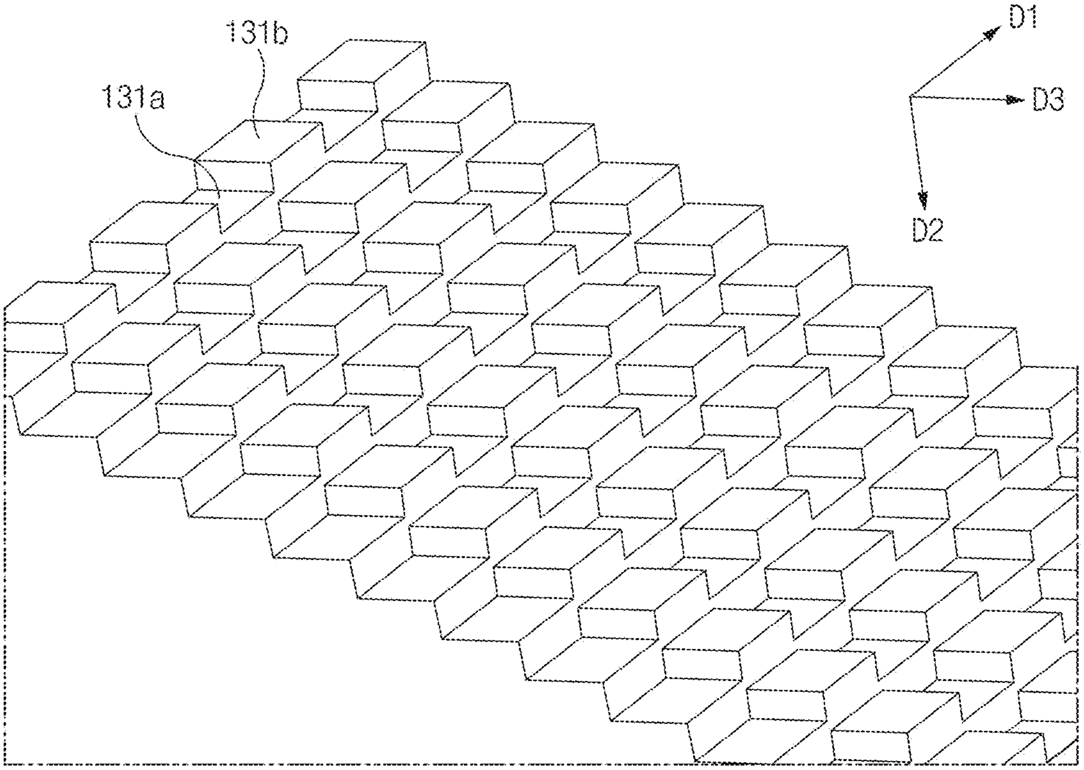
FIG. 2 is an enlarged view illustrating a plurality of facets in FIG. 1.
Figure 3:
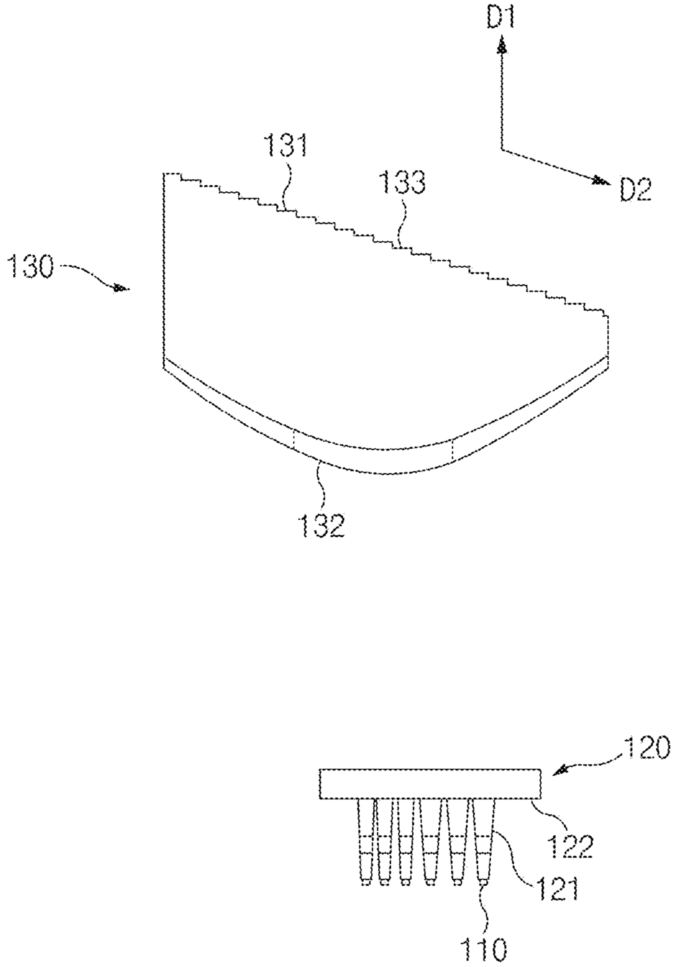
FIG. 3 is a cross-sectional view of a lamp for a vehicle according to an embodiment of the present disclosure.
Figure 4:
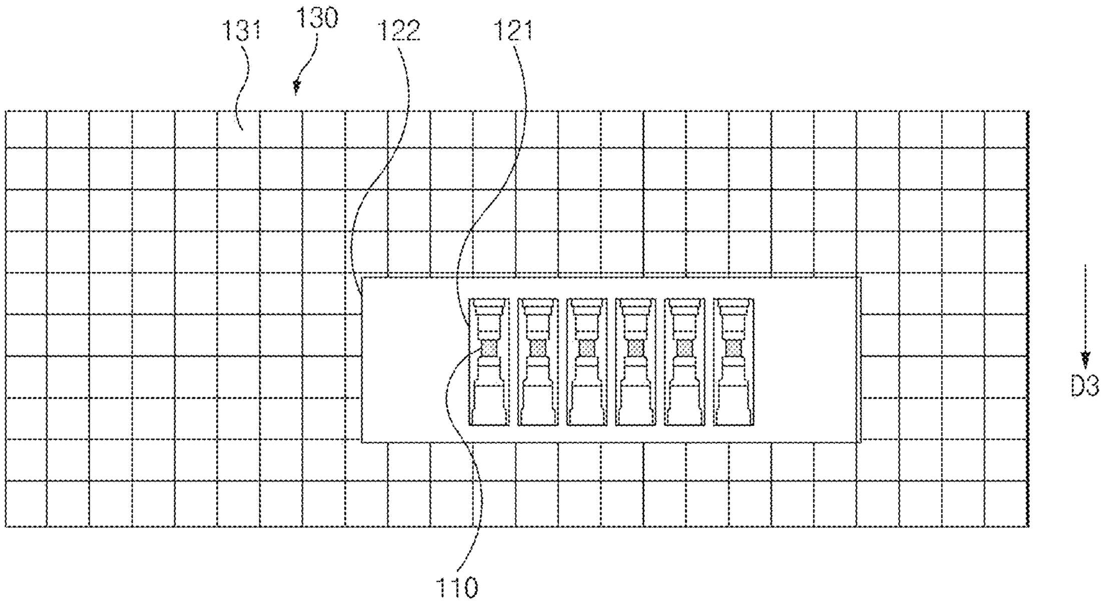
FIG. 4 is a view of a lamp according to an embodiment of the present disclosure, when viewed along a first direction.

FIG. 2 is an enlarged view illustrating a plurality of facets in FIG. 1. FIG. 3 is a cross-sectional view of the lamp for a vehicle according to an embodiment of the present disclosure. FIG. 4 is a view of the lamp according to an embodiment of the present disclosure, when viewed along the first direction.

As illustrated in FIG. 2, an end of the refraction part 130 in the second direction D2 or an opposite direction thereto may have a shape that protrudes in the first direction D1 as compared with an opposite end thereof.

According to the present disclosure, because the plurality of facets 131 are formed on an input surface 132 or an output surface 133, it seems as if an outer surface of the lens glittered like jewelries. Furthermore, because the light is not spread but is discontinued along the steps of the plurality of facets 131 due to the steps and thus the light is uniformly emitted, light uniformity may be improved. Accordingly, an image when the lamp is turned on and an image when the lamp is turned off may be improved.

Assume that one direction that is perpendicular to the first direction D1 and the second direction D2 is a. The facets 131 may include a first facet part 131*a* and a second facet part 131*b*. The first facet part 131*a* may be arranged to be stepped along the second direction D2. A plurality of first facet parts 131*a* may be provided.

The second facet part 131*b* may be disposed in the third direction D3 of the first facet part 131*a*. The second facet part 131*b* may protrude in the first direction D1 of the first facet part 131*a*. A plurality of second facet parts 131*b* may be provided.

To improve the light uniformity, it is advantageous to increase a degree of discontinuity of the facets 131. As an example, the light uniformity may be further improved when the facets 131 are discontinuous along both of a transverse direction and a longitudinal direction.

According to the present disclosure, because the second facet part 131*b* is disposed in the third direction D3 of the first facet part 131*a* and protrudes in the first direction D1 of the first facet part 131*a*, the facets 131 may be discontinuous along the transverse direction and the longitudinal direction and thus the light uniformity may be improved.

The refraction part 130 may include the input surface 132 and the output surface 133. The light that passed through the pattern forming part 120 may be input to the input surface 132. The light that is input to the input surface 132 may be output from the output surface 133. The facets 131 may be formed on the input surface 132 or the output surface 133. FIG. 1 illustrates that the facets 131 are formed on the output surface 133.

As an example, as illustrated in FIG. 1, the input surface 132 of the refraction part 130 may be formed to be convex along an opposite direction to the first direction D1, and the output surface 133 may have a shape that extends along the second direction D2 when viewed from the third direction D3. Then, the facets 131 may be formed on the output surface 133.

However, in contrast, the input surface 132 may have a shape that extends along the second direction D2 when viewed from the third direction D3. In this case, the output surface 133 may be formed to be convex along the first direction D1. The facets 131 may be formed on the input surface 132.

A plurality of light emitting parts 110 may be formed. As an example, the light emitting parts 110 may be LEDs. The pattern forming part 120 may include a plurality of first parts 121 and a second part 122. The pattern forming part 120 may be a rod optic. Then, the plurality of first parts 121 may extend in the first direction D1, and ends thereof in an opposite direction to the first direction D1 may be connected to the plurality of light emitting parts 110. The second part 122 may be connected to sides of the plurality of first parts 121 in the first direction D1 and may have a shape that extends in the third direction D3.

When viewed along the first direction D1, an area of an end of the first part 121 in the opposite direction to the first direction D1 may be smaller than an area of an end of the first part 121 in the first direction D1. Then, the first part 121 may pass in the first direction D1. Accordingly, the areas described here may mean areas of figures that are drawn along outer peripheries of the ends.

Figure 5:
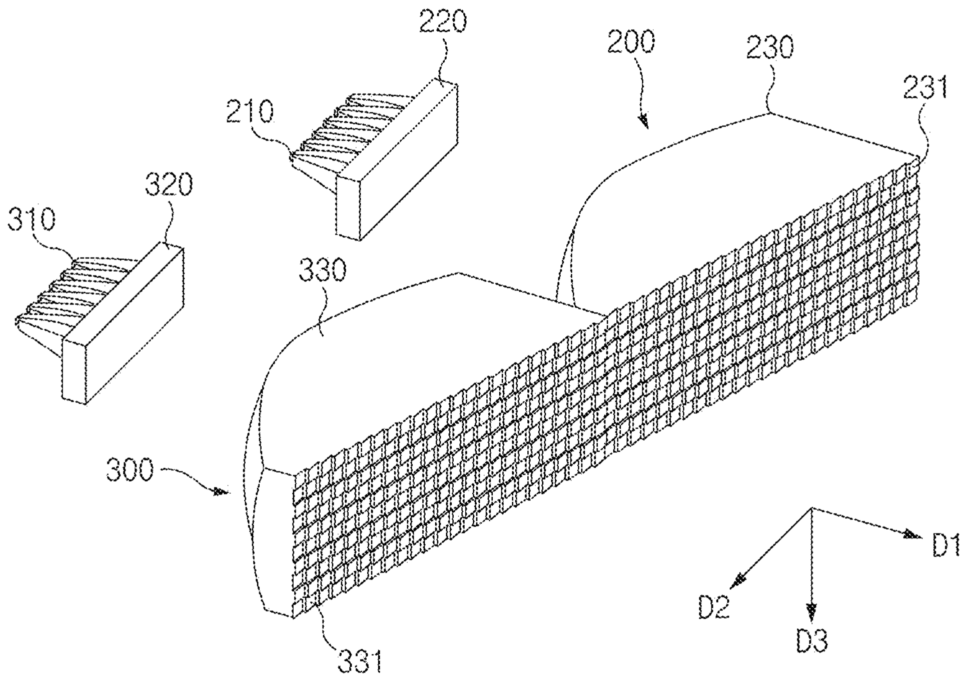
FIG. 5 is a perspective view conceptually illustrating a lamp assembly for a vehicle according to an embodiment of the present disclosure.
Figure 6:
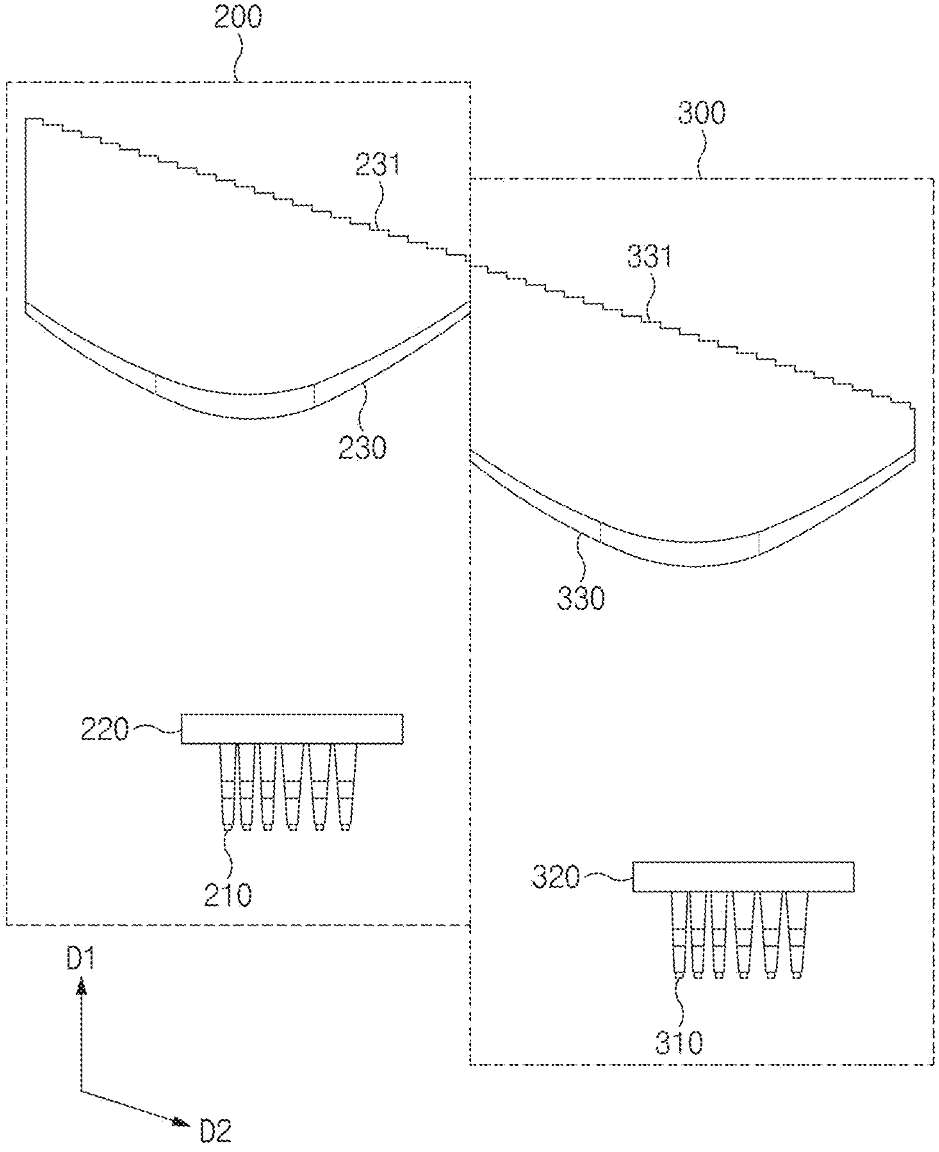
FIG. 6 is a cross-sectional view of a lamp assembly for a vehicle according to an embodiment of the present disclosure.

Hereinafter, a lamp assembly for a vehicle including the lamp for a vehicle will be described in detail based on the description of the above-described lamp for a vehicle. FIG. 5 is a perspective view conceptually illustrating the lamp assembly for a vehicle according to an embodiment of the present disclosure. FIG. 6 is a cross-sectional view of the lamp assembly for a vehicle according to an embodiment of the present disclosure.

Hereinafter, the lamp assembly for a vehicle will be described with reference to FIGS. 5 and 6. The components that are the same as or correspond to those of the above-described lamp for a vehicle will be denoted by the same or corresponding reference numerals, and a detailed description thereof will be omitted.

The lamp assembly for a vehicle according to an embodiment of the present disclosure may include a first lamp 200 and a second lamp 300. The second lamp 300 may be disposed in the second direction D2 of the first lamp 200. Here, it is apparent that the description of the first lamp 200 and the second lamp 300 do not limit the number of the lamps of the lamp assembly for a vehicle and the lamp assembly may further include a plurality of lamps.

The first lamp 200 may include a first light emitting part 210, a first pattern forming part 220, and a first refraction part 230. The first light emitting part 210 may irradiate a first light along the first direction D1. The first pattern forming part 220 may be disposed in the first direction D1 of the first light emitting part 210 to form a specific pattern by shielding a portion of the first light. The first refraction part 230 may be disposed in the first direction D1 of the first pattern forming part 220 and may be configured to refract the light that passed through the first pattern forming part 220. The first refraction part 230 may include a plurality of first facets 231 that are formed to be stepped along the second direction D2 that crosses the first direction D1.

The second lamp 300 may include a second light emitting part 310, a second pattern forming part 320, and a second refraction part 330. The second light emitting part 310 may irradiate a second light along the first direction D1. The second pattern forming part 320 may be disposed in the first direction D1 of the second light emitting part 310 to form a specific pattern by shielding a portion of the second light. The second refraction part 330 may be disposed in the first direction D1 of the second pattern forming part 320 and may be configured to refract the light that passed through the second pattern forming part 320. The second refraction part 330 may include a plurality of second facets 331 that are formed to be stepped along the second direction D2.

The second refraction part 330 may contact a side of the first refraction part 230 in the second direction D2. Accordingly, among the plurality of second facets 331, the second facet 331 located in an opposite direction to the second direction D2, and, among the plurality of first facets 231, the first facet 231 located in the second direction D2, may be disposed to be continuous to each other.

Figure 7:
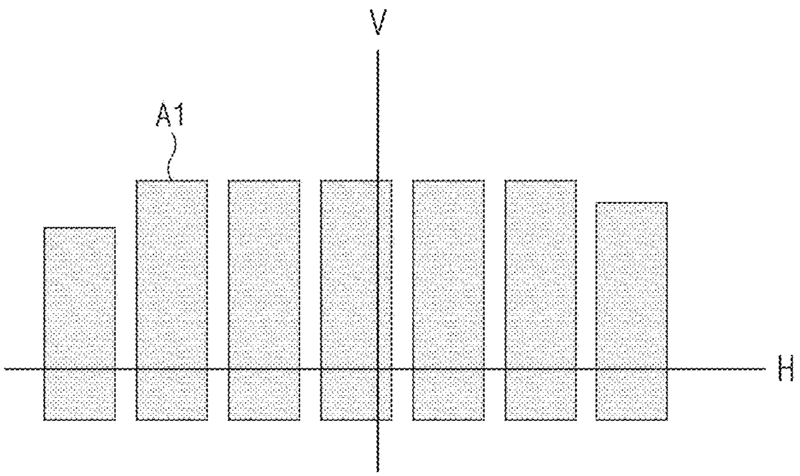
FIG. 7 is a view conceptually illustrating a first irradiation area.
Figure 8:
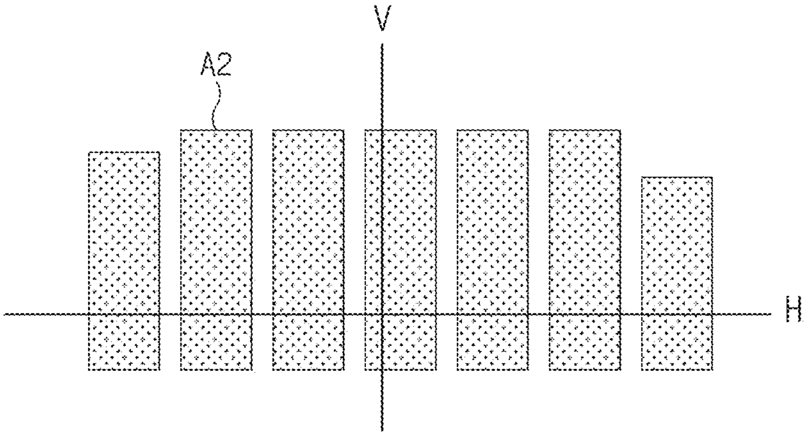
FIG. 8 is a view conceptually illustrating a second irradiation area.
Figure 9:
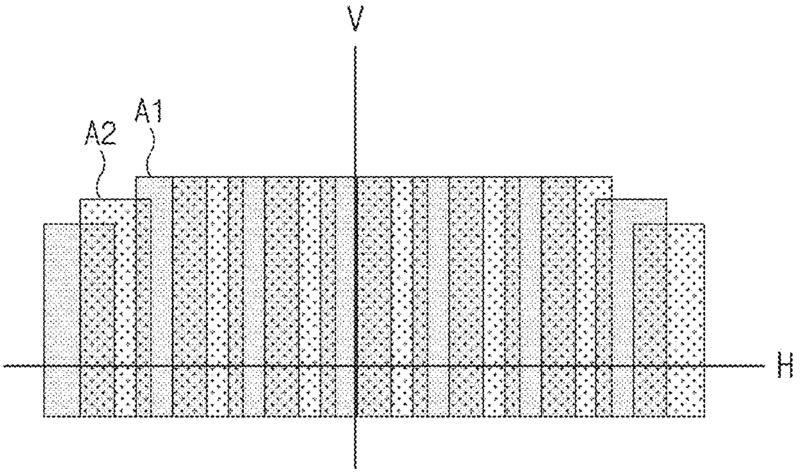
FIG. 9 is a view illustrating a first irradiation area and a second irradiation area together.

FIG. 7 is a view conceptually illustrating the first irradiation area. FIG. 8 is a view conceptually illustrating the second irradiation area. FIG. 9 is a view illustrating the first irradiation area and the second irradiation area together.

Assume that an irradiation area that is formed as the first light irradiated from the first light emitting part 210 passes through the first refraction part 230 is a first irradiation area A1 and an irradiation area that is formed as the second light irradiated from the second light emitting part 310 passes through the second refraction part 330 is a second irradiation area A2. The first irradiation area A1 may partially overlap the second irradiation area A2.

According to the present disclosure, as the first irradiation area A1 and the second irradiation area A2 partially overlap each other, an aperture of the first irradiation area A1 and an aperture of the second irradiation area A2 are buried whereby light uniformity may be enhanced.

According to the present disclosure, a plurality of facets may be formed on an outer lens, and thus, a lighting image and a non-lighting image may be improved.

Although the present disclosure has been described with reference to the limited embodiments and the drawings in the above description, the above description is simply an exemplary description of the technical spirits of the present disclosure, and an ordinary person in the art, to which the present disclosure pertains, may made various corrections and modifications without departing from the essential characteristics of the present disclosure. Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

What is claimed is:

1. A lamp for a vehicle, comprising:

a light emitting part configured to irradiate light in a first direction;

a pattern forming part configured to allow a portion of the light to pass through the pattern forming part and to shield a remaining portion of the light to form a predetermined pattern; and a refraction part configured to refract the portion of the light passing through the pattern forming part, wherein the refraction part includes:

a surface including a plurality of facets having a stepped configuration extending in a second direction that crosses the first direction, wherein:

the plurality of facets include:

a plurality of first facet parts arranged in rows that extend substantially in the second direction; and a plurality of second facet parts arranged in rows that extend substantially in the second direction, the rows of first facet parts and the rows of second facet parts are arranged in an alternating manner along a third direction perpendicular to the first and second directions. and the second facet parts protrude farther in the first direction than the first facet parts to which they are adjacent in the third direction.

2. The lamp of claim 1, wherein the refraction part includes:

an input surface through which the light enters the refraction part; and an output surface through which the light leaves the refraction part, wherein the plurality of facets is formed on the input surface or the output surface.

3. The lamp of claim 2, wherein:

the input surface is convex, and the facets are formed on the output surface.

4. The lamp of claim 2, wherein:

the output surface is convex, and the facets are formed on the input surface.

5. The lamp of claim 1, wherein:

the light emitting part includes a plurality of light emitting parts; and the pattern forming part includes:

a plurality of first parts arranged extending in the first direction and including first ends to which the plurality of light emitting parts are respectively connected; and a second part connected to second ends of the plurality of first parts which are opposite the first ends.

6. The lamp of claim 5, wherein, when viewed along the first direction, areas of the first ends are smaller than areas of the second ends of the first parts.

7. The lamp of claim 1, wherein each of the plurality of facets has an identical shape.

8. A lamp assembly for a vehicle, comprising:

a first lamp including a first light emitting part configured to irradiate a first light in a first direction, a first pattern forming part configured to allow a portion of the first light to pass through to form a predetermined pattern and to shield a remaining portion of the first light, and a first refraction part configured to refract the first light that passes through the first pattern forming part; and a second lamp including a second light emitting part configured to irradiate a second light in the first direction, a second pattern forming part configured to allow a portion of the second light to pass through to form a specific pattern and to shield a remaining portion of the second light, and a second refraction part configured to refract the second light that passes through the second pattern forming part, wherein the first refraction part includes:

a first plurality of facets having a first stepped configuration extending in a second direction that crosses the first direction, wherein the second refraction part includes:

a second plurality of facets having a second stepped configuration extending in the second direction, and wherein the second lamp is offset from the first lamp in the second direction, wherein the first plurality of facets include:

a plurality of first-first facet parts arranged in rows that extend substantially in the second direction; and a plurality of first-second facet parts arranged in rows that extend substantially in the second direction, the rows of first-first facet parts and the rows of first-second facet parts are arranged in an alternating manner along a third direction perpendicular to the first and second directions, and the first-second facet parts protrude farther in the first direction than each of the first-first facet parts to which they are adjacent in the third direction, the second plurality of facets include:

a plurality of second-first facet parts arranged in rows that extend substantially in the second direction; and a plurality of second-second facet parts arranged in rows that extend substantially in the second direction, the rows of second-first facet parts and the rows of second-second facet parts are arranged in an alternating manner along the third direction, and the second-second facet parts protrude farther in the first direction than each of the second-first facet parts to which they are adjacent in the third direction.

9. The lamp assembly of claim 8, wherein a side of the second refraction part contacts a side of the first refraction part in the second direction.

10. The lamp assembly of claim 8, wherein:

the first light irradiated from the first light emitting part that passes through the first refraction part forms a first irradiation area, the second light irradiated from the second light emitting part that passes through the second refraction part forms a second irradiation area, and the first irradiation area partially overlaps the second irradiation area.

* * * * *